No. 713,378. Patented Nov. 11, 1902.
J. C. BARNES.
METHOD OF AND APPARATUS FOR DRIVING THE CUTTERS IN MACHINE SHEEP SHEARS OR OTHER LIKE MACHINES.
(Application filed Aug. 6, 1902.)
(No Model.)
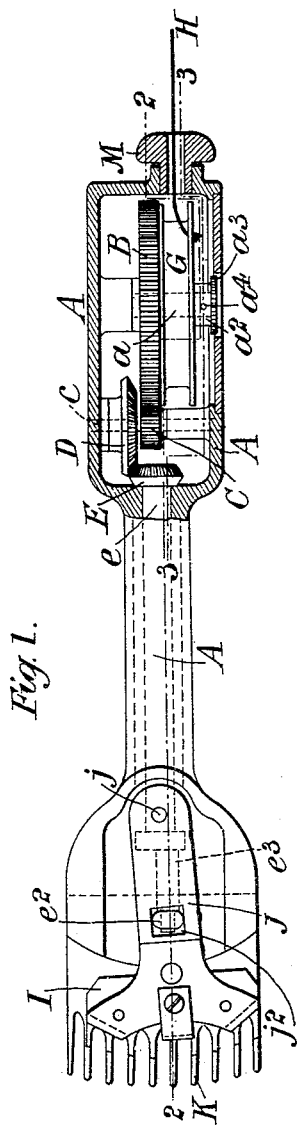
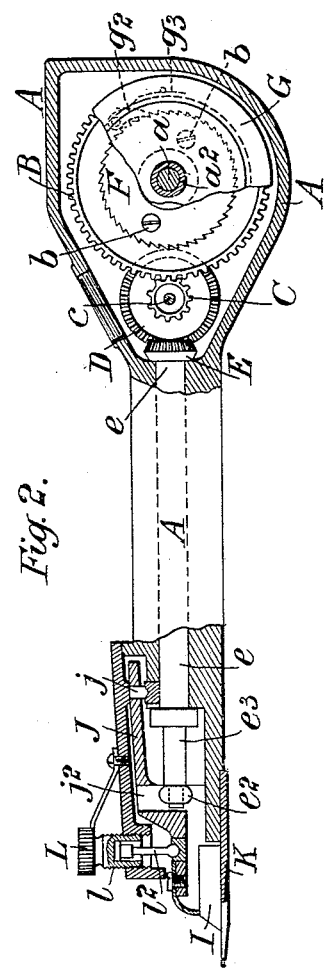
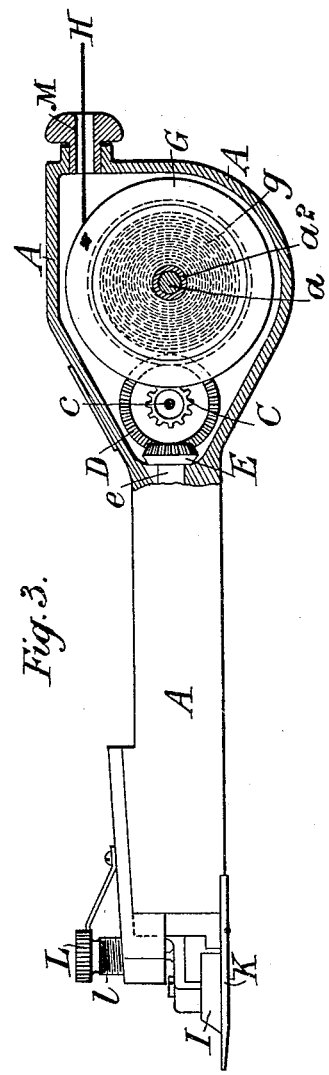
WITNESSES
F. W. Wright,
Walter Abbe.
INVENTOR
James Charles Barnes
BY Howson & Howson,
ATTORNEYS

UNITED STATES PATENT OFFICE.

JAMES CHARLES BARNES, OF SYDNEY, NEW SOUTH WALES, AUSTRALIA, ASSIGNOR TO RUSSELL HUGH WORTHINGTON BIGGS, OF LONDON, ENGLAND.

METHOD OF AND APPARATUS FOR DRIVING THE CUTTERS IN MACHINE SHEEP-SHEARS OR OTHER LIKE MACHINES.

SPECIFICATION forming part of Letters Patent No. 713,378, dated November 11, 1902.

Application filed August 6, 1902. Serial No. 118,626. (No model.)

*To all whom it may concern:*

Be it known that I, JAMES CHARLES BARNES, settler, a subject of the King of Great Britain and Ireland, residing at 254 Norton street, Leichhardt, Sydney, in the State of New South Wales, Australia, have invented a certain new and useful Improved Method of and Apparatus for Driving the Cutter in Machine Sheep-Shears or other Like Machines, of which the following is a specification.

My invention relates to an improved method of and apparatus for driving the cutter in machine sheep-shears and other like machines which are held in the hand during the shearing or clipping operation.

In the sheep-shears at present in use the motive power is supplied by means of a turbine or other similar contrivance or from a revolving shaft driven by steam or other power.

The objects of my invention are to dispense with the necessity of such extraneous source of power and to render each machine complete in itself and independent in action. I accomplish these objects by providing each machine with its own independent motor, and operate this by the forward motion of the machine itself. The motor or driving arrangement is contained in the handle or an extension of the handle of the machine and is operated while shearing by the tension upon a flexible cord (or the equivalent) which is alternately uncoiled from and coiled upon a drum, the outer end of the cord terminating in a loop or other device by which it can be attached to a support. The cord is normally wound on the drum and is unwound therefrom by the forward movement of the machine to effect the cutting operation. Upon the tension of the cord being relaxed the said cord is automatically re-coiled upon the drum ready for a renewal of the cutting operation, this re-coiling of the cord being effected by the unwinding of a spring which is wound up during the cutting operation. Therefore when the machine is pressed forward by the operator a rapid reciprocating motion is imparted to the cutter for shearing, and on the return movement the slackened cord is automatically re-coiled ready for a fresh shearing cutting operation on the next forward movement.

The accompanying drawings represent an apparatus constructed in accordance with my invention.

Figure 1 is a plan showing in section the driving arrangement according to my invention; and Figs. 2 and 3 are longitudinal vertical sections taken on the lines 2 2 and 3 3, respectively, Fig. 1.

Fixed to the casing A of the apparatus is an axle $a$, on which is mounted, so as to be free to rotate thereon, a spur-wheel B, which engages with a pinion C, secured to a spindle $c$, mounted in bearings in the casing A. Secured upon the spindle $c$ or to the pinion C is a bevel-wheel D, which imparts rotation to another bevel-wheel E, secured upon a longitudinal shaft $e$, by means of which motion of the driving mechanism is conveyed to the reciprocating cutter I, as hereinafter described; but this means for conveying the motion of the driving mechanism to the movable cutter forms no part of my present invention and may be arranged in any other convenient way.

The spur-wheel B is provided with a ratchet-wheel F, which may, as shown, be secured to the wheel B by screws $b$, or it may be made in one with the said wheel B.

Mounted so as to revolve upon the axle $a$ and adjacent to the wheel B is a drum or barrel G, within which is a spiral spring $g$, which has one end secured to the drum G and the other to the axle $a$ or, as shown, to a sleeve $a^2$, which enables the spring to be readily wound up. The sleeve is provided with a milled head $a^3$, by means of which it can be partly wound up and the said milled head be afterward secured to the axle $a$ by a pin $a^4$, so as to maintain a permanent tension on the spring.

Motion is conveyed from the drum G to the spur-wheel B by a pawl $g^2$, (see Fig. 2,) which is secured to the said drum and is kept in contact with the ratchet-wheel F by a spring $g^3$.

In place of the ratchet and pawl for conveying the motion from the drum to the spur-wheel any equivalent device can be employed—such, for example, as that used in connection with free-wheel bicycles.

A cord (or the equivalent) H is wound upon the drum G and has its inner end secured to the flange of the said drum, its outer end being secured to a fixed point outside the machine when in use, so that on moving the apparatus away from the said fixed point the drum G is rotated by the cord being unwound therefrom and the reciprocating cutter operated, the spring $g$ being at the same time wound up. On the backward movement of the apparatus the spring unwinds and rewinds the cord H upon the drum. The chamber containing the drum G may be provided at the otherwise-open side thereof with a cover, so as to inclose the drum and mechanism carried thereby.

The reciprocating cutter I is attached to a lever J, which is centered at one end on the pin $j$, the lever J being also provided with a slot or recess $j^2$, in which fits an antifriction-roller $e^2$, the said roller being mounted upon an eccentric-stud or crank-pin $e^3$, carried by the shaft $e$, so that as the said shaft is rotated the reciprocating cutter I is oscillated to and fro over the stationary cutter K.

L represents a tension device by which the pressure of the reciprocating cutter I on the stationary cutter K can be regulated, the said tension device consisting of a screw $l$ with a milled head, which bears on a thrust-piece $l^2$ with a ball end bearing in a recess in a convenient part of the reciprocating cutter I. M is a tubular guide for the cord H to pass through.

To enable the shears to be used more conveniently at any desired angle, I may employ a flexible tubular guide M for the cord to pass through, it being secured to the casing so as to accommodate itself to any reasonable curve.

The cord can be prevented from coiling too far upon the drum by a knot made too large to pass through the said guide.

I claim as my invention—

1. Handled shears having a reciprocating cutter, a casing, a shaft therein, means operated by the shaft to reciprocate the cutter, gearing, a spring, ratchet mechanism within the casing, and a cord to operate the gearing, substantially as described.

2. Handled shears having a reciprocating cutter, a rotary drum and gearing to transmit motion from the drum to the cutter, a spring and pawl-and-ratchet mechanism and a cord adapted to be fixed to a point outside the shears to secure the actuation of the cutter on the forward movement of the shears in the hand of the operator.

In testimony whereof I affix my signature in presence of two witnesses.

JAMES CHARLES BARNES.

Witnesses:
WILLIAM GERALD REYNOLDS,
FRED GOATER.